United States Patent [19]

Osawa

[11] 4,174,892
[45] Nov. 20, 1979

[54] AUTOMATIC FOCUSING SYSTEM

[75] Inventor: Noriaki Osawa, Tachikawa, Japan

[73] Assignee: Nihon Beru-Haueru Kabushiki Kaisha, Tokyo, Japan

[21] Appl. No.: 922,411

[22] Filed: Jul. 6, 1978

[30] Foreign Application Priority Data

Jul. 6, 1977 [JP] Japan ................................. 52/80008

[51] Int. Cl.$^2$ ............................................. G03B 13/20
[52] U.S. Cl. ..................................... 354/25; 250/204
[58] Field of Search ....................... 354/23 D, 25, 163; 352/140; 356/4; 250/201, 204

[56] References Cited

U.S. PATENT DOCUMENTS

| 4,010,479 | 3/1977 | Nobusawa | 354/25 |
| 4,059,756 | 11/1977 | Wilwerding | 250/204 X |

Primary Examiner—L. T. Hix
Assistant Examiner—William B. Perkey
Attorney, Agent, or Firm—Kirk McInerney; Roger M. Fitz-Gerald; John Moore

[57] ABSTRACT

A method and apparatus for automatically focusing a camera is described in which the camera has a stationary optical path and a scanning optical path for developing focusing signals. The scanning optical path is caused to undergo a range-finding reciprocation in which it reciprocates between first and second limit positions, as between the minimum lens focusing position and the infinite lens focusing position. Two focusing signals are generated during the range-finding reciprocation and the interval between the focusing signals is used to derive the distance to the subject. The lens is then positioned in accordance with the derived distance to the subject.

11 Claims, 8 Drawing Figures

AUTOMATIC FOCUSING SYSTEM

BACKGROUND OF THE INVENTION

This invention relates generally to automatic focusing systems for cameras. The invention is particularly directed to such systems wherein the camera lens is automatically focused in response to signals generated by a pair of optical systems, one stationary optical system and one scanning optical system.

Conventionally, automatic focusing systems of the type under consideration utilize a scanning mirror in one optical path for scanning a scene from a minimum focusing position to a maximum focusing position. The light from the scanning mirror is directed to an array of photosensitive devices which develop an electrical signal representative of the level of light impinging thereon.

Another non-scanning or stationary optical path is parallel to the optical path of the objective lens and projects light from the subject onto a second array of photosensitive devices. When the outputs of both arrays are in coincidence, a focusing pulse is generated by conventional circuitry. In addition, a control signal is generated when the scanning mirror is at a given position, as at the minimum focusing position for example. By determining the interval between the generation of the control signal and the focusing pulse, a further signal can be derived to drive the lens close to its correct focus position.

A problem associated with the system described above is that the interval between the focusing pulse and the control signal may vary, depending on the brightness of the subject. For example, when the subject reflects a low light level, the response time of the photosensitive arrays is relatively long. Conversely, when the subject reflects a higher light level, the response time of the photosensitive arrays is shorter. Hence, the point in time at which the focusing pulse is generated depends on the level of light reflected from the subject, that is, the brightness of the scene.

Because the time at which the control signal is developed is independent of scene brightness, the interval between the control signal and the focusing pulse may vary and result in inconsistent focusing of the lens.

OBJECTS OF THE INVENTION

Accordingly, it is a general object of the invention to provide an improved method and apparatus for automatically focusing a camera.

It is a more specific object of the invention to provide a method and apparatus for automatically focusing a camera accurately, irrespective of scene brightness.

SUMMARY OF THE INVENTION

According to the invention, a camera having a stationary optical path and a scanning optical path is focused by a first range-finding reciprocation of the scanning optical path. During the first reciprocation, the scanning optical path is caused to reciprocate between first and second limit focusing positions, as between the minimum lens focusing position and the infinite lens focusing position. Two successive focusing signals are generated during the range-finding reciprocation and the interval between the focusing signals is used to derive the distance to the subject. The lens is then positioned in accordance with the derived distance. Hence, accurate focusing is achieved irrespective of the brightness of the subject because the interval between the first and second focusing signals is substantially independent of subject brightness.

BRIEF DESCRIPTION OF THE FIGURES

The above-stated objects and other objects of the invention are more particularly set forth in the following detailed description and in the accompanying drawings of which.

DESCRIPTION OF THE PREFERRED EMBODIMENT

Figure 1:
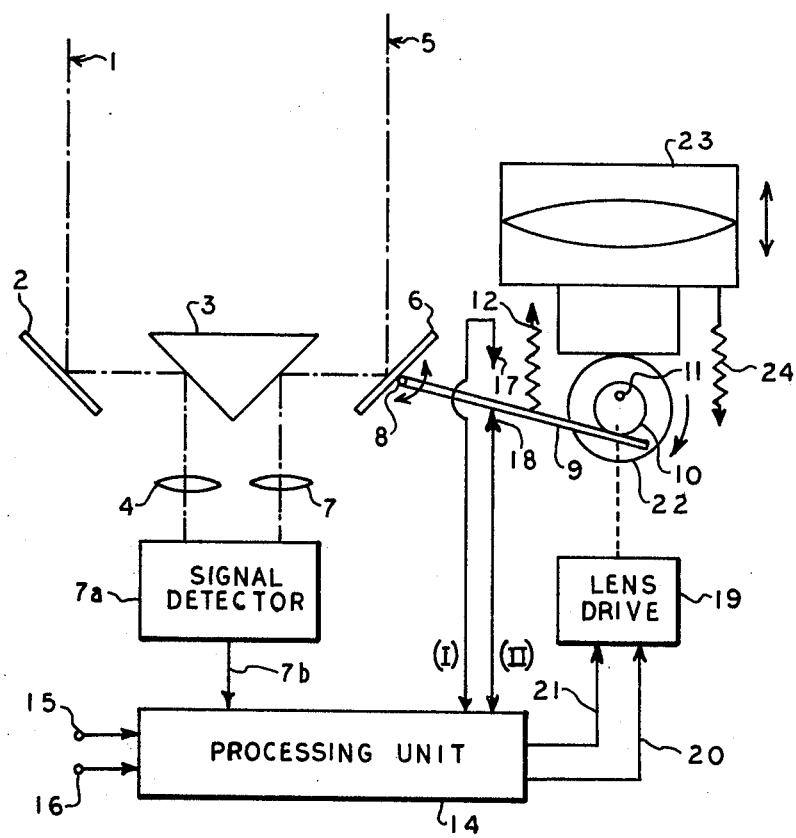
FIG. 1 is a schematic view showing an electrical and optical arrangement of an automatic focusing system according to the invention.

Referring now to FIG. 1, an automatic focusing apparatus according to the invention includes a stationary optical system 1 which includes a stationary mirror 2, a prism 3 and a lens 4. A scanning optical system 5 includes a swingable scanning mirror 6, the prism 3 and another lens 7. As is well known in the art, light which is reflected from the subject to be photographed is received by the first optical system 1, and is reflected by the mirror 2 through the prism 3 and the lens 4 onto a signal detector 7a which has a first array of light-responsive elements (CDS, for example) for generating an electrical output corresponding to the pattern of light incident thereon.

The scanning mirror 6 rotates to scan across the scene to be photographed from a first limit focusing position corresponding, for example, to the minimum focusing position of the lens, to a second limit focusing position which may correspond to the maximum or infinity focusing setting of the lens. The scanning optical path thus captures light reflected from the subject to be photographed.

The light received by the scanning optical system 5 is reflected by the mirror 6 and the prism 3 through the lens 7 to the signal detector 7a which includes a second array of light-responsive elements which produce a signal output representative of the pattern of light incident thereon.

When the pattern of light received from the stationary optical system 1 is the same as the pattern of light received from the scanning optical system 5, both arrays of light-responsive elements in the signal detector 7a generate signal outputs which are substantially identical. Conventionally, the signal outputs from both arrays of light-responsive elements are compared and, when they are equal, a focusing signal is developed at the lead 7b to indicate correspondence between the patterns of light received via the stationary optical system 1 and the scanning optical system 5. That focusing signal on the lead 7b is then used to automatically focus the camera.

To swing the mirror 6 across the scene, the mirror 6 is fixedly mounted to one end 8 of a lever 9 whose opposite end contacts an eccentric cam 10. The cam 10 is rotated by a drive motor (not shown) about an axis 11. By biasing the lever 9 in a counterclockwise direction by a spring 12, rotation of the eccentric cam 10 causes the scanning mirror 6 to swing about 8 against the bias of the spring 12 as shown by the double arrow. Hence, the mirror 6 scans objects from the infinite (substantially corresponding to the position of the mirror shown in FIG. 1) to a minimum focusing distance. In the illustrated embodiment, one rotation of the cam 10 causes one reciprocation of the mirror 6.

As indicated above, at one point in the scanning of the mirror 6, the images from the stationary optical system 1 and the scanning optical system 5 will be distributed in the same pattern on the light-responsive elements in the signal detector 7a, whereupon a focusing signal will be generated at the lead 7b. That focusing signal is applied to a processing unit 14 to develop signals for automatically focusing the camera.

Processing unit 14 receives a start signal at an input lead 15, a reset signal at an input lead 16, and contact signals I and II, the latter of which are generated in response to the scanning of the mirror 6. Specifically, the contact signal I is generated when the scanning mirror 6 is at a position corresponding to the minimum focusing distance of the camera, at which point the lever 9 comes into contact with a point 17. The contact signal II is generated when the scanning mirror 6 is at a position corresponding to the maximum or infinite focusing position of the camera, at which point the lever 9 comes into contact with a point 18, a condition which is illustrated in FIG. 1.

In response to these signals, the processing unit 14 controls a lens drive circuit 19 via a lead 20 for focusing the camera. In addition, the processing unit 14 supplies the lens drive circuit 19 with a signal on a lead 21 for exerting additional control over the lens drive circuit 19 when the focusing system operates in a mode where the lens is moved to its minimum focusing position just prior to the automatic focus adjustment of the lens.

In response to the input signals received from the processing unit 14, the lens drive circuit 19 controls the rotation of the motor (not shown) for rotating the cam 10 and also for simultaneously rotating an eccentric cam 22 which rotates about the axis 11. As shown, the lens assembly 23 rides on the surface of the cam 22 and a spring 24 is coupled between the lens assembly 23 and any convenient support within the camera for holding the lens assembly 23 against the surface of the cam 22. Hence, in this embodiment, the lens assembly 23 moves in and out in response to the rotation of the cam 22 and in synchronism with the movement of the mirror 6. With the illustrated shape and position of eccentric cams 10 and 22, the lens assembly 23 is moved to bring the subject into focus as the mirror 6 scans the subject to be photographed.

Figure 2:
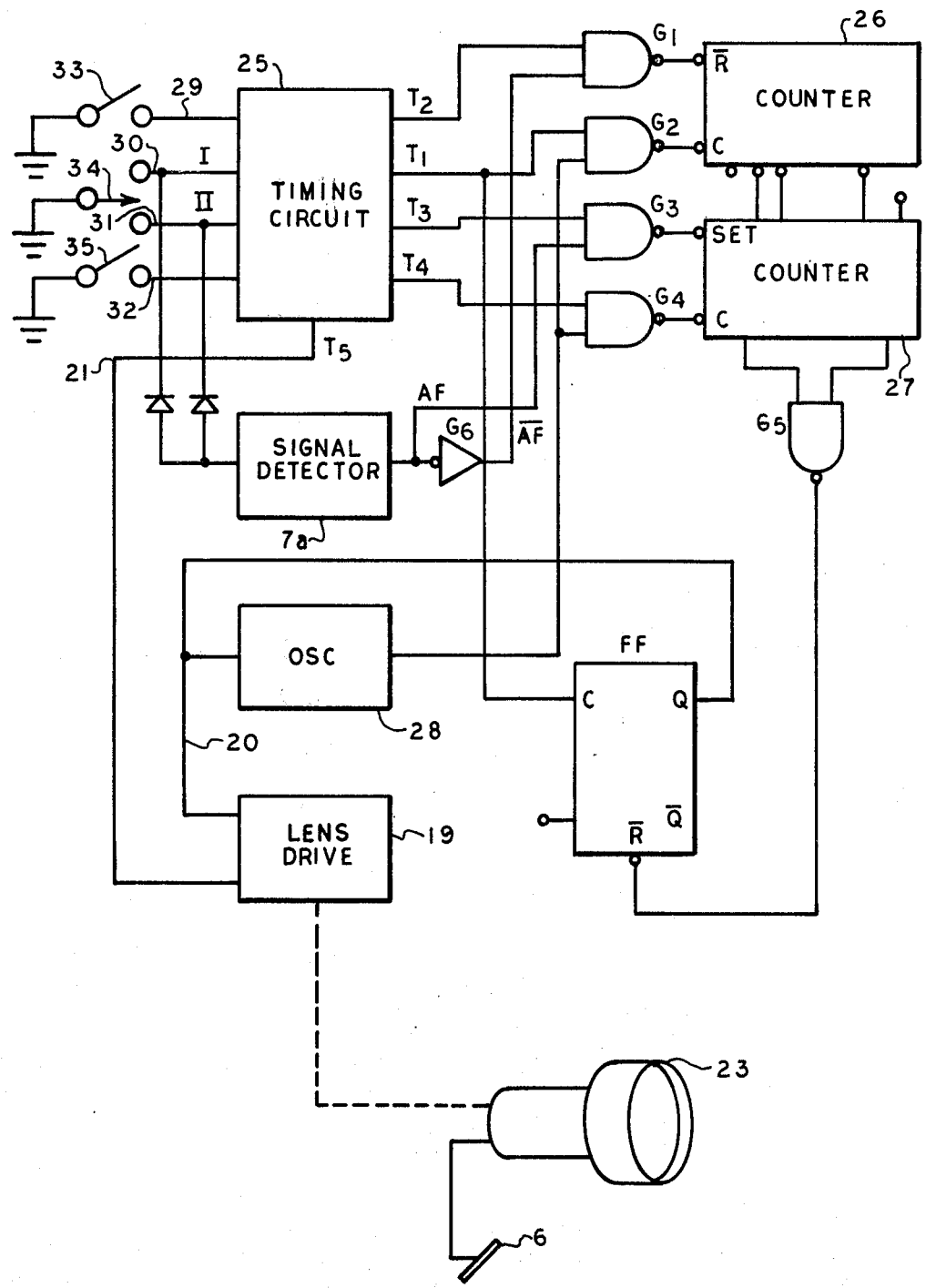
FIG. 2 is a block diagram more specifically illustrating a portion of the electrical arrangement of FIG. 1.

Referring now to FIG. 2, the circuitry details of the processing unit 14 and its interconnection with the lens drive circuit 19, the signal detector 7a and the lens assembly 23 is shown. The processing unit 14 includes a timing circuit 25, counters 26 and 27, gates $G_1$ through $G_6$, a flip-flop FF and an oscillator 28. As is set forth in more detail below, the oscillator 28 develops clock pulses which are counted by the counters 26 and 27 in response to timing signals developed by the timing circuit 25 and in response to focusing signals developed by the signal detector 7a. As the mirror 6 scans the scene to be photographed from a first limit focusing position (preferably the minimum focusing position) to a second limit focusing position (preferably an infinity focusing position), a first focusing signal is developed by the signal detector 7a. As the mirror 6 reciprocates back from an infinity focusing position to minimum focusing position, a second focusing signal is developed by the signal detector 7a. During the interval between the generation of the first and second focusing signals, the counter 26 counts the number of clock pulses generated by the oscillator 28. A number substantially equal to one-half the number (one-half count) of the clock pulses counted by the counter 26 is stored in the counter 27.

The mirror then swings from its first or minimum focusing position toward its second limit or infinity focusing position, whereupon a third focusing signal is generated by the signal detector 7a. Because the system "knows" how many clock pulses were counted in the interval between the first and second focusing signals, it also knows that substantially the same number of clock pulses will occur in an interval between the third focusing signal and a fourth focusing signal. Hence, after the third focusing signal has been generated, when the mirror is at a position at which it is within one-half count of generating a fourth focusing signal, the counter 27 begins counting clock pulses. When the counter 27 reaches a count equal to the count it has previously stored, (one-half the number of clock pulses counted between the first and second focusing signals), the lens drive circuit 19 stops the motion of the lens assembly 23 at a position where it is properly focused.

Figure 3:
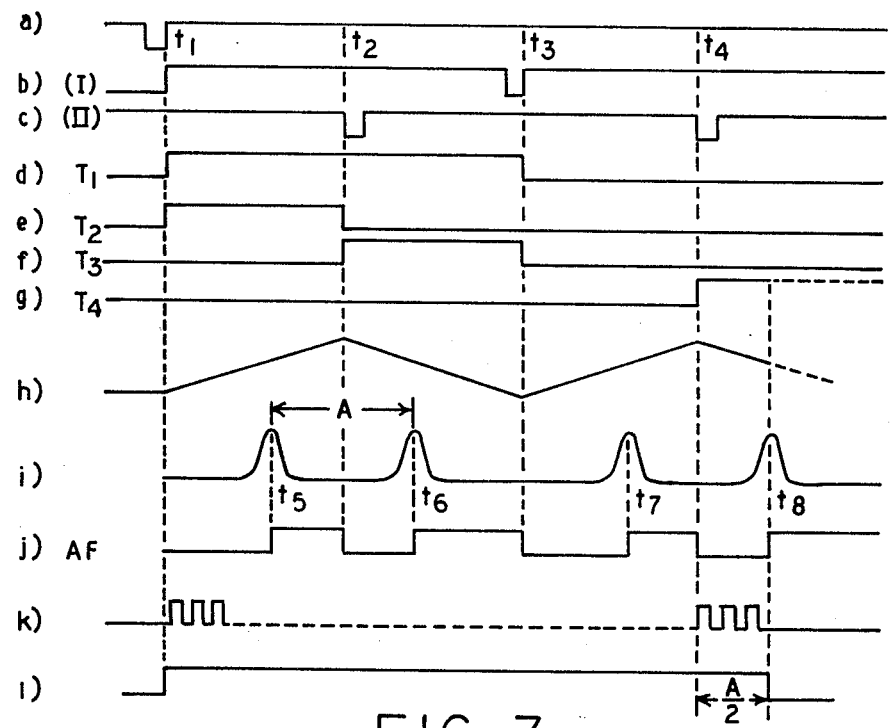
FIGS. 3a through 3l and 4a through 4e are waveforms illustrating the operation of the embodiment shown in FIGS. 1 and 2.

Referring now to the timing circuit 25, that circuit develops signals $T_1$, $T_2$, $T_3$, $T_4$ and $T_5$ at its output leads in response to signals received at its input leads 29, 30, 31 and 32. The input lead 29 is associated with a start switch 33 which may be operated by pushing the shutter. When that occurs, the switch 33 generates a pulse signal as shown in FIG. 3a. As illustrated, the signal generated by the closure of the switch 33 goes from a low level to a high level at time $t_1$ for enabling the timing circuit 25.

Input leads 30 and 31 are associated with a switch 34 which closes whenever the lever 9 (FIG. 1) comes into contact with the point 17. Thus, the contact signal I appears as a low level on the lead 30 when the mirror 6 is at its minimum focusing position. When the lever arm 9 loses contact with the point 17, the signal I goes from a low level to a high level, as indicated at time $t_1$ in FIG. 3b.

When the scanning mirror 6 scans at the infinite focusing position at a time $t_2$, the arm 9 contacts the point 18 to cause the switch 34 to generate the contact signal II. The signal II goes from a high level to a low level immediately upon contact between the lever 9 and the point 18, and returns to a high level when the lever 9 comes out of contact with the point 18. As shown in FIG. 3c, contact between the lever 9 and the point 18 occurs at time $t_2$.

To correspond the generation of the contact signals I and II with the position of the mirror 6, FIG. 3h, graphically illustrates the scanning of the mirror 6 as a function of time. As shown, at time $t_1$ the mirror 6 is in a position corresponding to a minimum focusing position of the camera. Thereafter, the mirror scans from a minimum focusing position to a maximum focusing position at the time $t_2$, and then returns to a minimum focusing position at time $t_3$. The mirror 6 then re-scans beginning at time $t_3$ and reaches another position of maximum focusing position at time $t_4$. As shown in FIGS. 3b, 3c and 3h, the contact signal I is at a high level whenever the mirror is at a minimum focusing position and the contact signal II goes from a high level to a low level whenever the mirror 6 is at a position corresponding to maximum focusing position.

Figure 4:
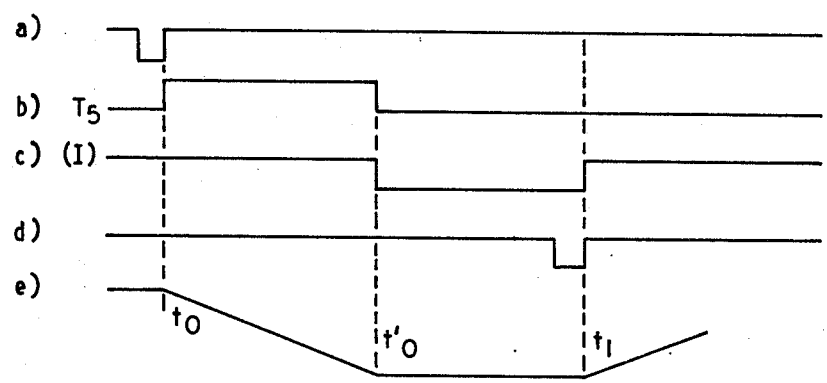

Referring again to the timing circuit 25, its input lead 32 is associated with a reset switch 35 which is operated by a conventional shutter charging mechanism which charges the camera's shutter as the film is advanced by the film winding knob. When the film winding knob is rotated to wind the film and charge the shutter, switch 35 is closed to generate the reset signal as shown in FIG. 4a, generated for example at time $t_0$ which is prior to time $t_1$. In FIG. 4, the point in time identified as $t_1$ is the same point in time $t_1$ designated in FIG. 3.

The reset signal at input 32 causes the timing circuit 25 to provide a signal $T_5$ at time $t_0$ as shown in FIG. 4b. Signal $T_5$ is applied to the lens drive circuit 19 via lead 21 to bring the lens, stopped by the previous focusing operation, to a first, and preferably minimum, lens focusing position. Thus, at the time $t_0$ the lever 9 comes into contact with the point 17 to bring the signal I from a high level to a low level (FIG. 4c) and, as the mirror 6 continues to be moved, the lever 9 comes out of contact with the point 17 to cause the signal I to go from a low level to a high level at time $t_1$. At time $t_1$ the mirror and the lens are at minimum focusing positions and the camera is ready to go into its range-finding and focusing operation.

It is noted that the signal $T_5$ goes low at time $t_0$ and stays low thereafter, indicating that the operation of the reset switch 35 exerts no further control over the position of the lens during the focusing operation. It merely places the lens in a predetermined position, preferably a minimum focusing position, so that movement of the lens is always started from a known position.

The effect of the signal $T_5$ is also shown in FIG. 4e which illustrated the mirror scanning angle. As shown, the signal $T_5$ causes the mirror to rotate to a minimum focusing position at time $t_0$ and to remain at that position until time $t_1$ when a start signal, shown in FIG. 4d, appears. The sequence of events which occurs at and subsequent to the time $t_1$ is shown by the various wave forms of FIG. 3.

When the switch 33 is turned on at time $t_1$, the timing circuit 25 generates signals $T_1$ and $T_2$ as shown in FIGS. 3d and 3e. The signal $T_2$ is applied to the reset input of the counter 26 via the gate $G_1$.

The signal $T_1$ remains high until $t_3$, that is, for one complete range-finding reciprocation of the mirror 6. Signal $T_2$ remains high until the time $t_2$ at which the mirror is at a maximum focusing position. At that point, the signal $T_2$ goes low and remains low for the remainder of the automatic focusing operation.

The timing circuit 25 also produces a signal $T_3$ which is coupled through a gate $G_3$ to the set terminal of the counter 27. In addition, a signal $T_4$ is generated by the timing circuit 25 which is applied to terminal C of the counter 27 via gate $G_4$.

The signal $T_3$ is initially low at the time $t_1$, goes high at the time $t_2$ and stays high until time $t_3$ at which the mirror will have completed one complete range-finding reciprocation. Signal $T_4$ starts out low at time $t_1$ and remains low through the range-finding reciprocation of the scanning mirror. At time $t_2$ the scanning mirror starts a second reciprocation, with the signal $T_4$ still low. During the second reciprocation, when the scanning mirror reaches a maximum focusing position at time $t_4$, the signal $T_4$ goes high.

Referring now to FIG. 3i, the focusing signals which are developed by the signal detector 7a, are illustrated. As shown, signal detector 7a generates a first focusing signal at the time $t_5$ while the scanning mirror scans between minimum focusing position and maximum focusing position. As the mirror scans from maximum focusing position to minimum focusing position, duration $t_2-t_3$, the signal detector 7a generates a second focusing signal at time $t_6$. The interval between the first and second focusing signals is designated at A in FIG. 3i. As will be explained in greater detail hereinafter, the counter 26 counts the clock pulses generated by the oscillator 28 which occured during the interval A.

The scanning mirror is then caused to re-scan the subject a second time beginning at time $t_3$ at which time the scanning mirror begins scanning from minimum focusing position toward maximum focusing position. At time $t_7$ a third focusing signal is generated by the signal detector 7a. After time $t_4$, the next or fourth focusing signal would be generated at the time $t_8$.

The focusing signal illustrated in FIG. 3i is shaped by the signal detector 7a to the form shown as signal AF in FIG. 3j. The signal AF is applied to one input of the gate $G_3$, the latter of which is coupled to the set terminal of the counter 27. The AF signal is also applied to a gate $G_6$ for inversion to a signal designated as $\overline{AF}$. This inverted signal is applied to one input of the gate $G_1$.

The signal AF is used to cause the counter 27 to read the status of the count in the counter 26 in a parallel manner so that the value read into the counter 27 is shifted one bit from an inverted count value in the counter 26, and so that the count thus stored in the counter 27 is equal to $2^n - 1$ minus one-half of the count in counter 26. That is, when the gate $G_3$ sets the counter 37, it stores a count substantially equal to one-half the count in the counter 26. Because the counter 26 counts clock pulses during the interval $t_5-t_6$, the counter 27 will store a count equal to one-half the number of clock pulses counted by the counter 26 during the interval $t_5-t_6$.

The operation of the embodiment shown in FIG. 2 will now be explained in more detail. To initiate the automatic focusing operation, there are two alternate methods. The first is, as described above, to operate the reset switch 35 with the aid of the film charging mechanism to bring the photographing lens to a position corresponding to its minimum focusing distance. The second method is to push the start switch 33 without any use of the reset switch 35 in order to start the lens moving and to initate the automatic focusing operation at an instant when contact signal I is turned from a high level to a low level and then again to a high level. By either method, the lens assembly 23 will have been placed at its minimum focusing position.

As a result of the signal $T_1$ assuming a high level at time $t_1$, the flip flop FF is actuated so that its Q output turns on the oscillator 28 and actuates the lens drive circuit 19 for moving the lens assembly 23 (see FIGS. 3k and 3l). The clock pulses generated by the oscillator 28 are shown in FIG. 3k and those clock pulses are passed to terminal C of the counter 26 via gate $G_2$.

The next event of interest occurs at time $t_5$ at which the signal $\overline{AF}$ from the gate $G_6$ goes from a high level to a low level upon the occurrence of a first focusing signal, as a result of which the counter 26 is cleared and begins counting the clock pulses.

When the scanning mirror is at a maximum focusing position at time $t_2$, the signal II goes from a high level to a low level, the signal $T_2$ goes from a high level to a low level, and the signal $T_3$ goes from a low level to a high level. These transitions, for the present, cause no change in the counters 35 and 36.

As the scanning mirror continues scanning between times $t_2$ and $t_3$, a second focusing signal is developed at time $t_6$, whereupon the signal AF goes from a low level to a high level. This transition renders the gate $G_3$ conductive and causes a signal to be applied to the set terminal of the counter 27 to read the status of the counter 27 in parallel as explained above. That is, the counter 27 stores a count which is substantially equal to one-half the number of clock pulses counted by the counter 26 during the interval $t_5$–$t_6$.

At time $t_3$, the subject to be photographed is rescanned and the scanning mirror moves from a minimum focusing position toward a maximum focusing position, causing the signal detector to generate a third focusing signal at time $t_7$. As the scanning continues, the scanning mirror and the lens reach a position of maximum focus at time $t_4$, whereupon the signal II goes from a high level to a low level and the signal $T_4$ goes from a low level to a high level. At this point, the gate $G_4$ becomes conductive to enable the counter 27 to count the clock pulses which it receives at its terminal C. As the counter 27 counts clock pulses received at its terminal C, that count will ultimately correspond to the number which it stored when it read the status of the counter 26. That is, it will count a number of clock pulses equal to half the number which the counter 26 counted in the interval between times $t_5$ and $t_6$. When that occurs, all bits of the counter 27 are turned to high so that the output from the gate 5 goes low for resetting the flip-flop FF. Upon that occurrence, the Q output of the flip-flop disables the oscillator 28 and the lens drive circuit 19 to stop the movement of the lens. Thus, the lens will automatically be stopped at a time corresponding to time $t_8$ when the lens is set at a correct focal position.

By virtue of the fact that the counter 27 "knows" how many pulses were counted during the interval A (FIG. 3$i$), that is, from $t_5$ to $t_6$, the system also knows the counting half that number of pulses beginning at the time $t_4$ and ending at the time $t_8$ will place the lens at its best focal point. Moreover, by setting the position of the lens as a function of the interval A between successive focusing signals, the lens is properly positioned independent of any delay which may occur in the generation of the focusing signals as a result of a low level of scene brightness. This is because the interval A remains substantially constant irrespective of that brightness.

Figure 5:
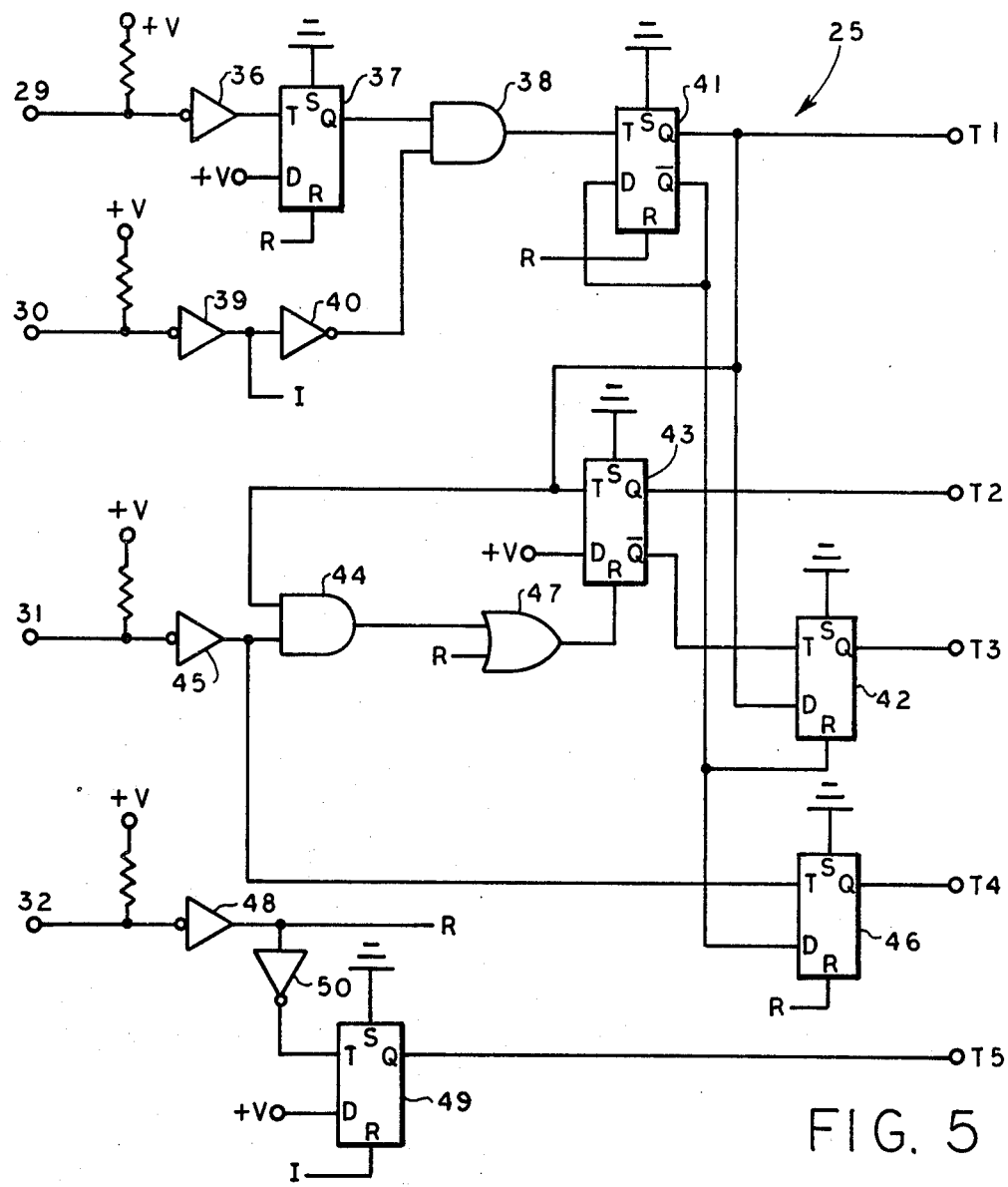
FIGS. 5, 6, 7 and 8 illustrate exemplary embodiments of the timing circuit 25, the oscillator 28, the lens drive circuit 19, and counters 26 and 27, respectively of FIG. 2.

An exemplary electronic circuit for effecting the above-described functions of the timing circuit 25 is illustrated in FIG. 5. As shown, the timing circuit 25 includes input terminals 29, 30, 31 and 32 and outputs $T_1$ through $T_5$. The terminal 29 is coupled via an inverter 36 to the T input of a flip-flop 37. The Q output of the flip-flop 37 is coupled to one input of an AND gate 38.

The terminal 30 is coupled via inverters 39 and 40 to the other input of the AND gate 38, the output of which is coupled to the T input of another flip-flop 41. The Q output of the flip-flop 41 provides the $T_1$ signal and is used internally of the timing circuit 25 for driving the D terminal of flip-flop 42, the T input of a flip-flop 43 and one input of an AND gate 44. The other input to the AND gate 44 is received from the terminal 31 via an inverter 45, the output of the latter also being coupled to the T terminal of another flip-flop 46.

The output of the AND gate 44 is coupled to one input terminal of an OR gate 47, the other input of which receives an R signal which is developed by an inverter 48 whose input receives the signal on terminal 32.

The flip-flop 43 receives the output of the OR gate 47 at its reset terminal and provides an output at its Q terminal to the T terminal of the flip-flop 42 and develops the signal $T_2$ at its $\overline{Q}$ output.

The signal $T_3$ is developed by the Q output of the flip-flop 42. The flip-flop 46 develops a signal $T_4$ at its Q output in response to the signals appearing at its T terminal and its B terminal, the latter of which receives the Q output from the flip-flop 41.

The $T_5$ signal is developed by a flip-flop 49 in response to an I signal at its reset terminal developed between the inverters 39 and 40 and to a signal applied to its T terminal from an inverter 50, the latter of which receives the output of the inverter 48.

All the flip-flops in FIG. 5 may be model Nos. CD 4013 and AND gates may be models CD 4081, the OR gate 47 may be model No. CD 4072 and the inverter may be model No. CD 4069, all available from the RAdio Corporation of America.

Figure 6:
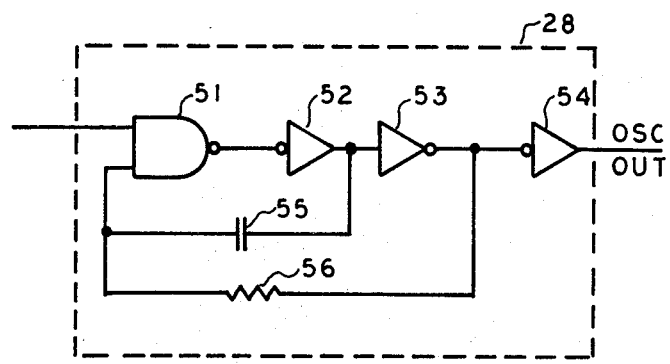

Referring now to FIG. 6, there is shown an exemplary circuit for the oscillator 28. That circuit includes a AND gate 51 which receives the output of the flip-flop FF shown in FIG. 2. The output of the OR gate 51 is connected to a string of three serially connected inverters 52, 53 and 54, with a capacitor 55 coupled between the lower input to the AND gate 51 and the junction between inverters 52 and 53. A resistor 56 is also coupled between the lower input of the AND gate 51 in the junction of the inverters 53 and 54.

Figure 7:
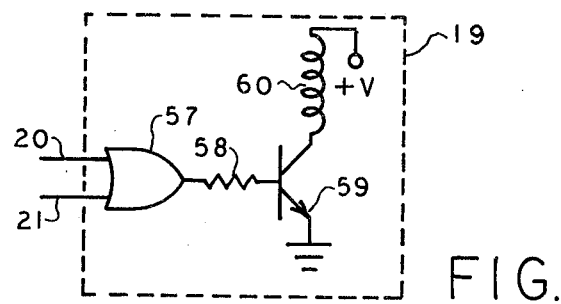
Figure 8:
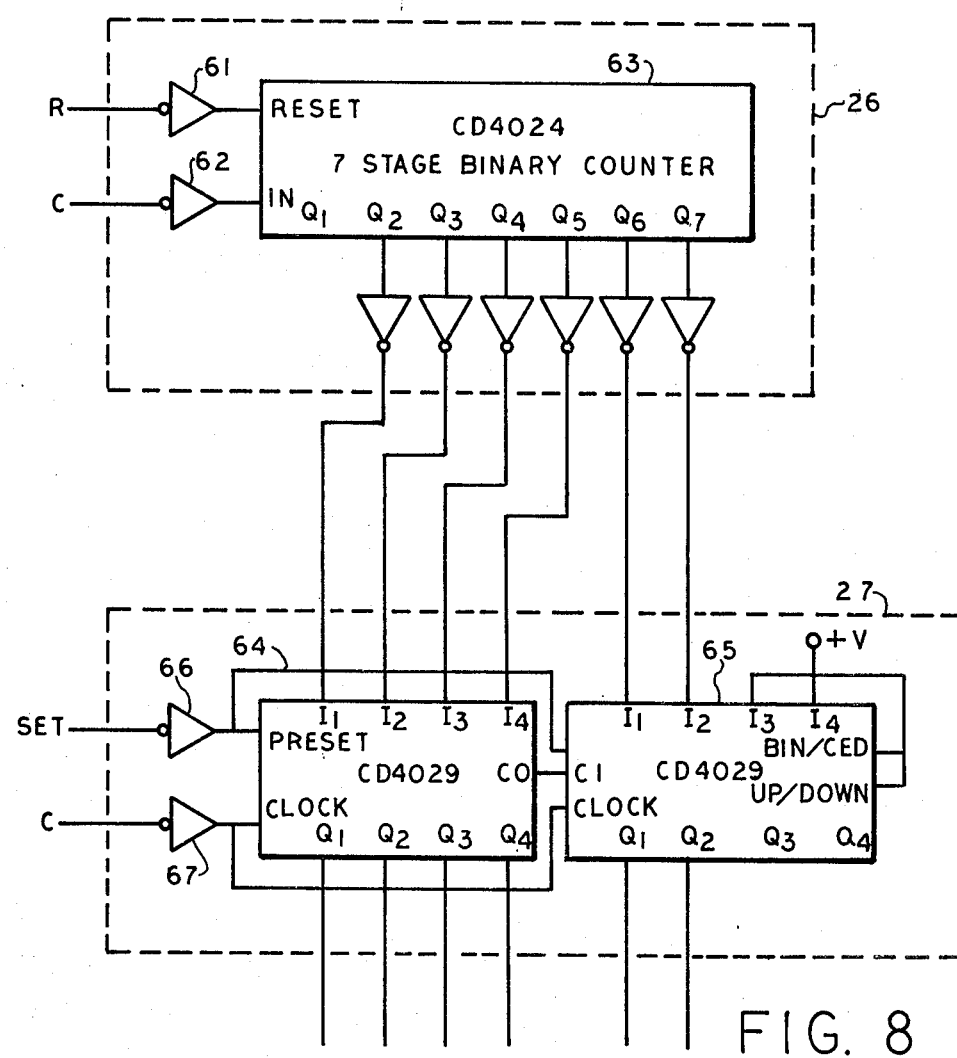

The motor drive circuit 19 is shown in more detail in FIG. 7. Specifically, the inputs 20 and 21 are applied to an OR gate 57, the output of which is coupled through a resistor 58 to the base of a transistor 59. A solenoid 60 is coupled between a source of voltage and the collector of the transistor 59 for driving the motor which advances the cams 10 and 22 of FIG. 1. The counters 26 and 27 of FIG. 2 are shown in more detail in FIG. 8. As shown, the counter 26 receives inputs at its $\overline{R}$ and C terminals and those inputs are coupled through a pair of inverters 61 and 62 to the reset and IN terminals of a seven stage binary counter 63 which may be a CD 4024 counter available from the Radio Corporation of America. The $Q_2$–$Q_7$ outputs of the counter 63 are each coupled to the input of an inverter, the outputs of which are coupled to the inputs of the counter 27.

The counter 27 includes a pair of up/down counters 64 and 65, each of which may be type CD 4029 counters available from the Radio Corporation of America. The counter 27 receives the outputs of the inverters from the counter 63 at the $I_1$, $I_2$, $I_3$ and $I_4$ terminals of a presettable up/down counter 64. Another presettable up/down counter 65 receives the inverted $Q_6$ and $Q_7$ outputs of the counter 63 at its $I_1$ and $I_2$ terminals.

Each of the counters 64 and 65 receives an input at its preset terminal from an inverter 66, the latter of which is coupled to the set input of the counter 27. Another inverter 67 passes the C input from the counter 27 to the clock terminals of the counters 64 and 65. The $Q_1$–$Q_4$ outputs of the counter 64 and the $Q_1$ and $Q_2$ outputs of the counter 65 provide multiple inputs to the gate $G_5$ (FIG. 2) for turning the output of that gate low as described above.

The structure of the signal detector 72 shown in FIGS. 1 and 2 is not described in detail herein. However, that detector may be a Honeywell Visitronic Module, Model No. VM 001 or VM 002.

In the embodiment described above, the clock pulses which were counted by the counters 26 and 27 have been described as being generated by oscillator 28. Alternately, those clock pulses may be generated by the movement of the lens by providing the latter with a slit or contact which is adapted to touch a mating contact to generate the clock pulses as the lens is moved. In this alternate embodiment, improved accuracy is obtained because the clock pulses are generated in conjunction with the actual movement of the lens.

In the embodiment described with reference to FIGS. 1-4, the lens is moved uring the interval from time $t_1$ to $t_3$ during which the scanning mirror effects one reciprocating scanning movement. This movement of the lens during the interval $t_1$-$t_3$ is unnecessary and can be disadvantageous. Preferably, the lens is moved only during the interval from time $t_3$ in the second reciprocative scanning operation of the mirror.

To effect the movement of the lens only during the second reciprocative scanning operation, the eccentric cam 10 (FIG. 1) is given a substantially ellipsoidal shape and positioned such that the lever 9 contacts the longer radius portion of the cam when the mirror 6 is at a position of maximum focus. The shorter radius of the cam would urge the lever 9 to position the mirror 6 at a position corresponding to the minimum focusing distance. In addition, the eccentric cam 22 is shaped such that it has a half portion which is circular and another half portion which is ellipsoidal and positioned such that the lever 9 contacts the circular portion for focusing on the minimum distance and for contacting the ellipsoidal portion for focusing on the infinite. With that arrangement, half a rotation of the motor causes one reciprocative scanning movement of the mirror 6, but no movement of the lens assembly 23, which therefore remains at the minimum focusing position. The next half rotation of the motor causes the same movement of the mirror 6 and additionally moves the lens to its focusing position. The latter motion of the lens would begin at the time $t_3$.

In the embodiment shown in FIG. 1, the lens assembly 23 is shown as being moved in and out by virtue of the illustrated contact of the cam 22. That illustration is only diagrammatic because the reciprocation of the lens is actually caused by contact between a ring on the lens and the cam 22.

Irrespective of obvious changes which may be made to the disclosed embodiment, the invention includes effecting two reciprocative movements of the scanning mirror, the first reciprocation being used for range-finding to determine the interval between successive generated focusing signals. In the second reciprocation of the scanning mirror, the lens is moved to its best focusing position on the basis of the interval detected between the focusing signal during the first reciprocation. Thus, even though the point in time at which a focusing signal is generated may vary due to variations in the brightness of the subject to be photographed, the time interval between successive focusing signals remains substantially constant. Hence, the range-finding and the focusing of the lens is highly accurate and independent of the brightness of the subject.

Although the invention has been described in terms of a specific preferred structure and steps, it will be obvious to those skilled in the art that many variations and alterations may be made without departing from the spirit and scope of the invention. Accordingly, it is intended that all such modifications and alterations be included within the scope of the invention as defined by the appended claims.

What is claimed is:

1. In a camera having a lens adapted to be automatically focused in response to focusing signals generated by coincidental signal outputs from a first photosensitive device receiving light from a subject via a stationary optical path and from a second photosensitive device receiving light from the subject via a scanning optical path, a method of automatically focusing the lens, comprising:
   developing a first focusing signal by causing the scanning optical path to scan, from a first limit focusing position to a second limit focusing position, and developing a second focusing signal by causing the scanning optical path to re-scan from the second limit focusing position to the first limit focusing position;
   computing the interval between the first and second focusing signals; and
   automatically positioning the lens in accordance with the computed interval.

2. A method as set forth in claim 1 wherein the lens is automatically positioned by first prepositioning the lens at a given limit focusing position and by then further positioning the lens in accordance with the difference between the given limit focusing position and the computed time interval between the first and second focusing signals.

3. A method as set forth in claim 1 wherein the interval between the focusing signals is computed by:
   generating periodic clock pulses; and
   counting the number of clock pulses which are generated between the first and second focusing signals, whereby the accuracy of the derived distance to the subject is improved.

4. A method as set forth in claim 3, including prepositioning the lens at a minimum focusing position, driving the lens toward the maximum focusing condition while again causing the scanning optical path to scan from a minimum focusing position to a maximum focusing position to develop a third focusing signal, and stopping the lens when the number of clock pulses generated subsequent to the occurrence of the third focusing signal is substantially equal to the number of clock pulses counted between the first and second focusing signals.

5. In a camera having a lens adapted to be automatically focused in response to focusing signals generated by coincidental signal outputs from a first photosensitive device receiving light from a subject via a stationary optical path and from a second photosensitive device receiving light from the subject via a scanning optical path, a system for automatically focusing the lens, comprising:
   scan control means for causing the scanning optical path to scan from a first limit focusing position to a second limit focusing position to develop a first focusing signal, and for causing the scanning optical path to scan from the second limit focusing position to the first limit focusing position to develop a second focusing signal;

means for computing the interval between the first and second focusing signals; and means for automatically positioning the lens in accordance with the computed interval.

6. An automatic focusing system as set forth in claim 5 wherein the means for computing the interval includes means for generating clock pulses and a counter for counting the number of clock pulses which are generated in the interval between the first and second focusing signals.

7. An automatic focusing system as set forth in claim 6 wherein said means for automatically positioning the lens includes means for prepositioning the lens at a given limit focusing position and for driving the lens toward an opposite limit focusing position while said scan control means causes the scanning optical path to again scan from the first limit focusing position to the second limit focusing position to develop a third focusing signal, and means for stopping the lens when the number of clock pulses generated subsequent to the occurrence of the third focusing signal is substantially equal to the number of clock pulses counted in the interval between the first and second focusing signals.

8. An automatic focusing system as set forth in claim 7 wherein the first limit focusing position of the scanning optical path corresponds to a minimum focusing position, wherein the second limit focusing position of the scanning optical path corresponds to a maximum focusing condition, wherein the given limit focusing position of the lens corresponds to a minimum focusing position, and wherein the opposite limit focusing position corresponds to a maximum focusing position.

9. In a camera having a lens adapted to be automatically focused in response to focusing signals generated by coincidental signal outputs from a first photosensitive device receiving light from a subject via a stationary optical path and from a second photosensitive device receiving light from the subject via a scanning optical path, a system for automatically focusing the lens, comprising:

means for reciprocating the scanning optical path between a first limit focusing position and a second limit focusing position to develop a first focusing signal as the scanning optical path scans from the first limit focusing position to the second limit focusing position, to develop a second focusing signal as the scanning optical path scans from the second limit focusing position back to the first limit focusing position, and to develop a third focusing signal as the scanning optical path re-scans from the first limit focusing position to the second limit focusing position;

means for generating clock pulses;

a counter adapted to count the clock pulses generated in the interval between the first and second focusing signals;

means for driving the lens from the first limit focusing position toward the second limit focusing position as the scanning optical path re-scans from the first limit focusing position toward the second limit focusing position;

counting means for reading the count in said counter, for storing a one-half count substantially equal to one-half the count in said counter, and for counting the clock pulses which occur said one-half count subsequent to the generation of the third focusing signal; and means for stopping the lens in response to said counting means counting a number of pulses equal to said stored one-half count, whereby the lens is stopped substantially at the focus position which corresponds to the next successive focus signal which would be generated by the scanning optical path, and the lens is correctly focused.

10. An automatic focusing system as set forth in claim 9 wherein said first limit focusing position corresponds to a minimum focusing position and said second limit focusing position corresponds to a maximum focusing position.

11. An automatic focusing system as set forth in claim 7 wherein said means for positioning the lens at a given limit focusing position is adapted to hold the lens stationary during the generation of said first and second focusing signals and to move the lens toward said opposite limit focusing position only when said scanning optical path is caused to re-scan from said first limit focusing position toward said second limit focusing position.

* * * * *